April 18, 1961 C. VAN DER LELY ET AL 2,980,430
DEVICE FOR SPREADING STREWABLE MATERIAL DURING TRAVELLING
Filed March 30, 1954 7 Sheets-Sheet 1

INVENTORS
CORNELIS VAN DER LELY
ARY VAN DER LELY

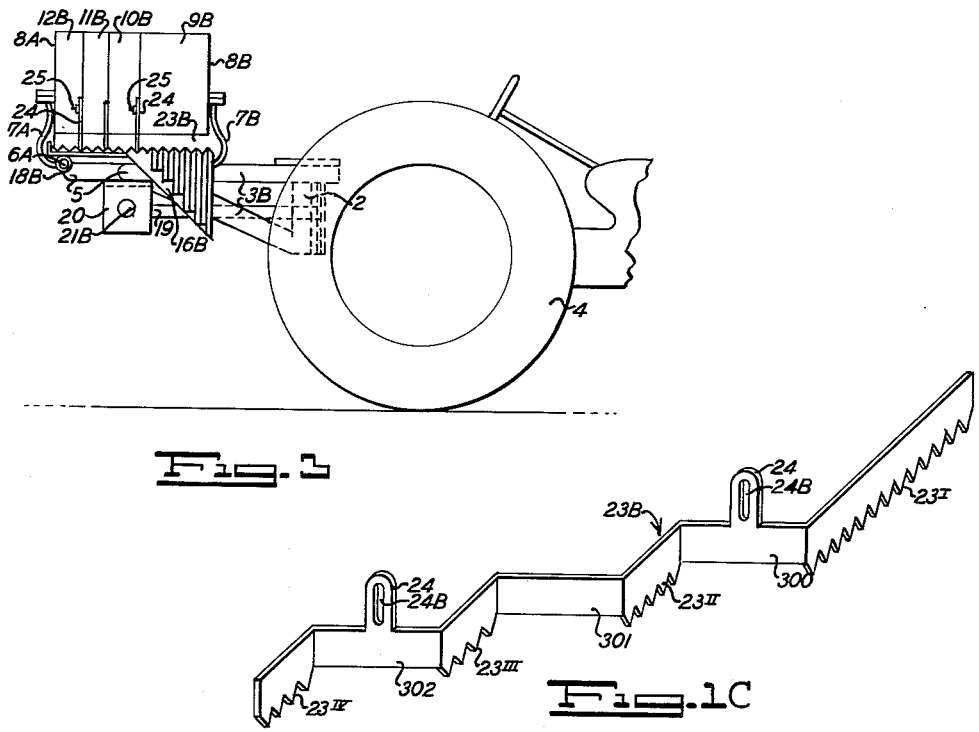
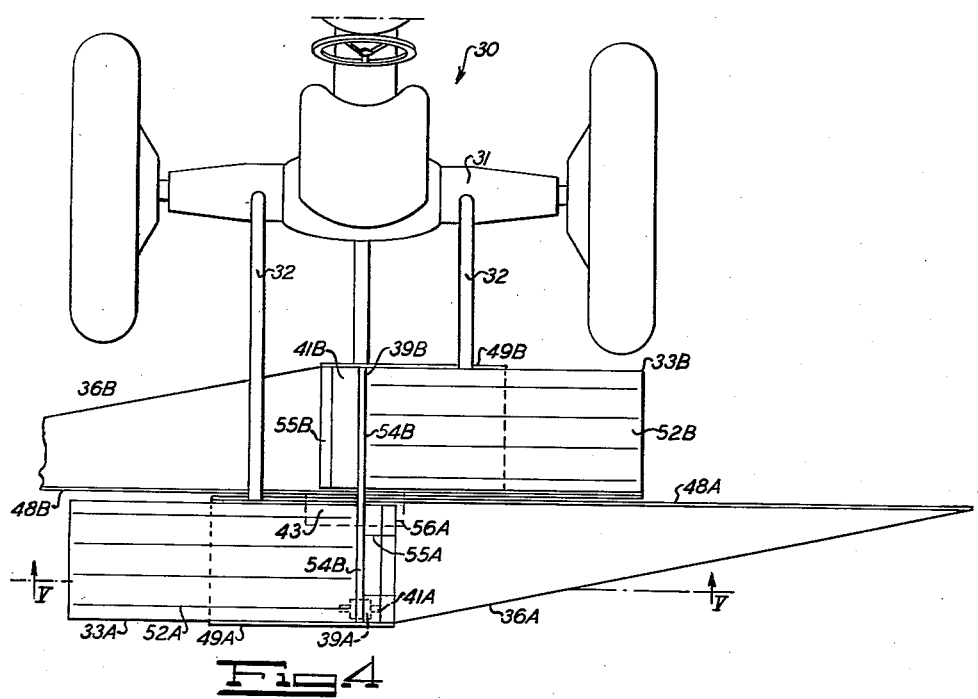

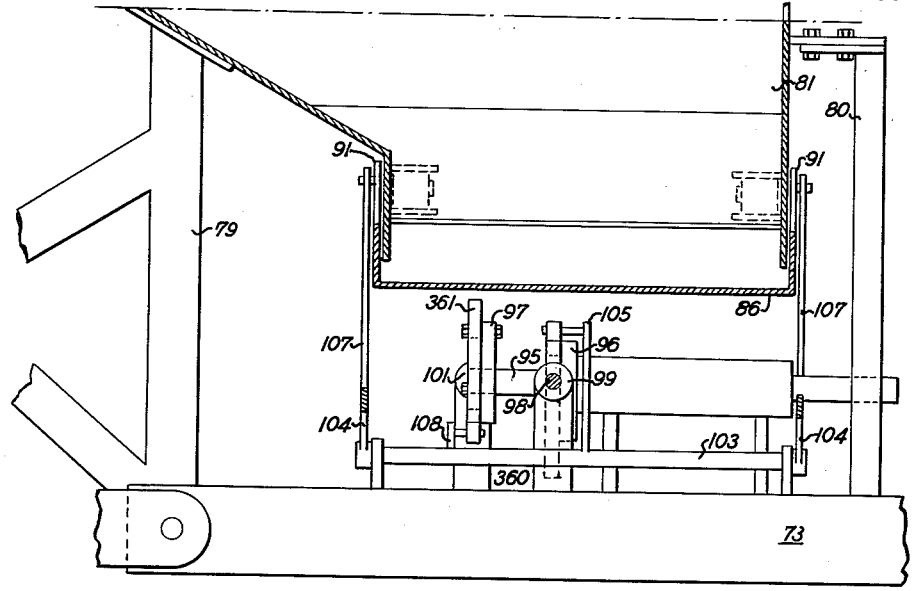
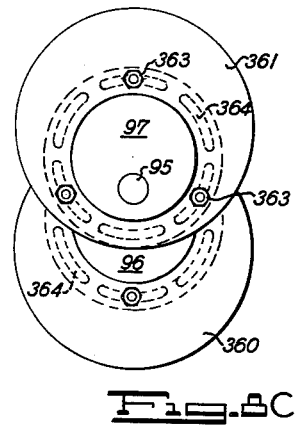
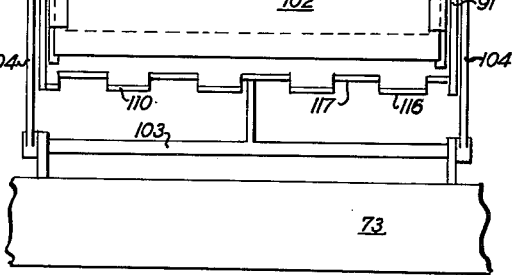
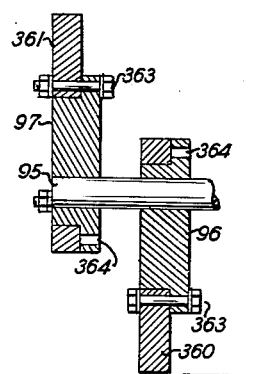

United States Patent Office 2,980,430
Patented Apr. 18, 1961

2,980,430

DEVICE FOR SPREADING STREWABLE MATERIAL DURING TRAVELLING

Cornelis van der Lely and Ary van der Lely, Maasland, Netherlands, assignors to C. van der Lely N.V., Maasland, Netherlands, a Dutch limited company of the Netherlands Filed Mar. 30, 1954, Ser. No. 419,825

Claims priority, application Netherlands Apr. 2, 1953

27 Claims. (Cl. 275—7)

This invention relates to vehicular devices for spreading strewable material and from which material is discharged and spread over a striplike area of the ground which is of considerably larger width than the distance between supporting wheels provided on the devices.

It is an object of the present invention to provide a device of the above indicated kind which is of cheap, robust and simple construction and which nevertheless permits an even distribution of the material over a large width. According to the invention this is attained by the fact that the device is provided with a number of supporting members for transverse displacement of the strewable material, extending collectively over the width of the area of the ground and reaching on both sides of the device collectively beyond the wheels, said supporting members being put into oscillating movement by a shaking device and collectively causing the material discharged through the openings of the container to be dropped and evenly distributed over the width of the said area. Due to the shaking movement of the supporting members the dropping and delivery of the material are not affected by irregularities of the terrain. Moreover, the local supply of the material permits the use of relatively large discharge openings.

A further object of the invention is to provide a device the width of which may be easily reduced during transport.

Still further objects, features and details of the present invention will appear from the following description with reference to the accompanying drawings, in which:

Figs. 1, 2 and 3 show respectively in plan view, in plan view, in back elevation and in side elevation, viewed in the direction of the arrow III in Fig. 1, a distributor according to the invention mounted on a tractor;

Fig. 1C is a perspective view of the slides controlling the outlet slits of the container shown in Fig. 3;

Figs. 4 and 5 show another embodiment of the distributor according to the invention which is also mounted on a tractor, respectively in plan view and in vertical section on the line V—V of Fig. 4;

Figure 8B is an enlarged vertical sectional view of the eccentric disks in Figure 8A;

Figure 8C is a view of the structure in Figure 8B in side elevation;

Fig. 8D is a sectional view along a longitudinal plane in Fig. 7;

Fig. 8E is a side view of the stucture in Fig. 8A; and

Figure 1:
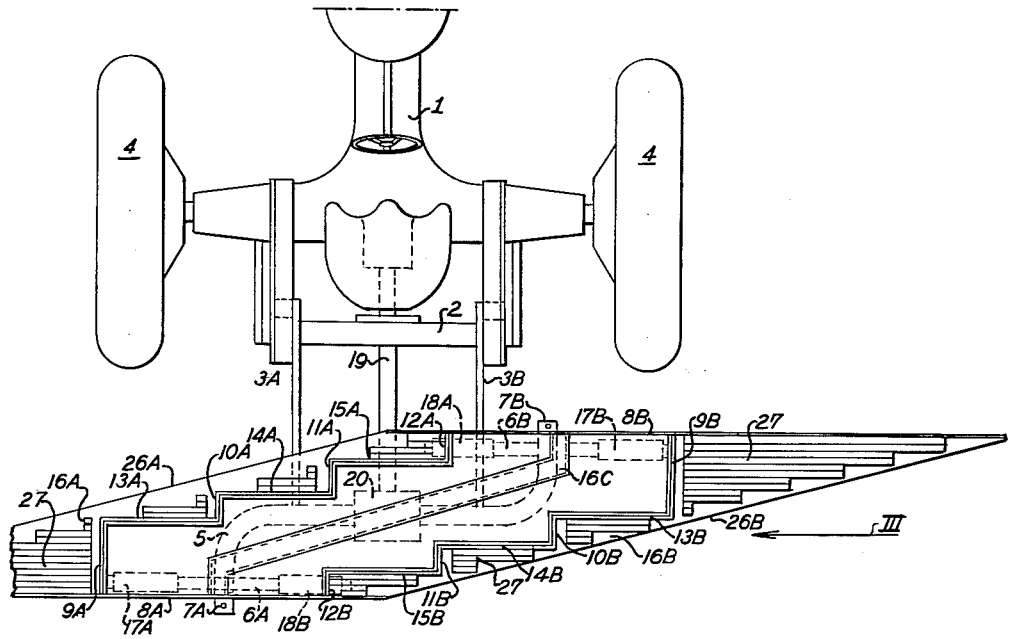
Figure 2:
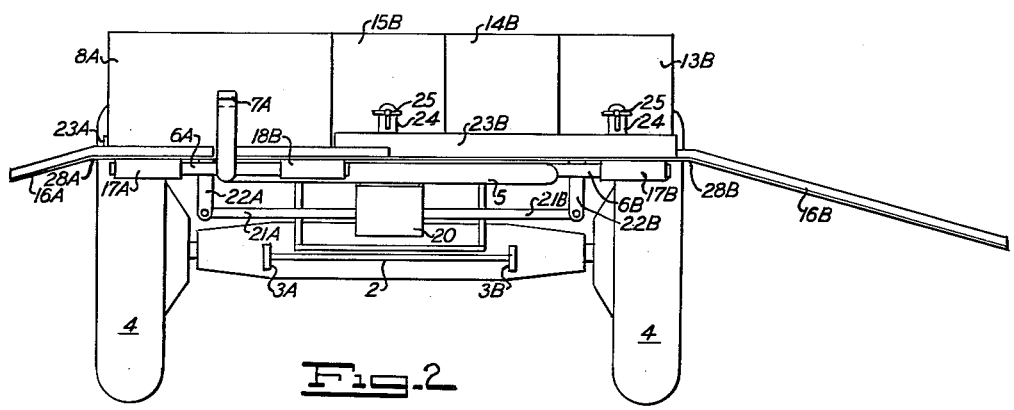

In Figs. 1, 2 and 3 of the drawings the rear axle stay 1 of a tractor is provided with a supporting structure 2 to which are secured two arms 3A and 3B extending behind the rear wheels 4. Said arms carry a horizontal tube 5 which is bent in the shape of an S and has secured to its ends the centers of horizontal guide bars 6A and 6B extending transversely to the direction of travel. To the same ends are also fixed straps 7A and 7B respectively carrying the rear wall 8A and the front wall 8B of a container for the material to be strewn. Both walls are vertical and transverse to the direction of travel of the vehicle. The left edges of the walls 8A and 8B are connected together by a side wall which is composed of several parts, viz. parts 9A, 10A, 11A and 12A arranged in the direction of travel, said parts being interconnected by other wall parts 13A, 14A and 15A arranged transversely to the direction of travel. Symmetrically to the center of the container are provided similar wall parts 9B—15M of the other side wall of the container.

Figures 1A, 1B:
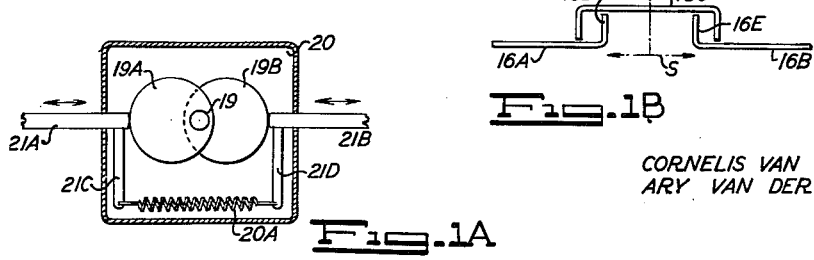
Fig. 1A is a detail on a larger scale of the reciprocating mechanism shown in Figs. 1–3.
Fig. 1B is a cross-section view of the covering strip shown in Fig. 1 on a larger scale.

The bottom of the container is constituted by two substantially trapezoid-shaped plates 16A and 16B. The plate 16A is supported by bushings 17A and 18A on the bars 6A and 6B. In a similar manner the plate 16B is supported by bushings 17B and 18B. Said four bushings can reciprocate over a short distance on the two guide bars 6A and 6B, so that the plates 16A and 16B can each perform a reciprocating motion transversely to the direction of travel of the vehicle. Such motion may be imparted at will to the plates by the driver of the vehicle; this is enabled by means of a horizontal shaft 19 which extends backwards from the tractor and may be coupled with the motor of the tractor. Said shaft drives a mechanism 20 fixed under the tube 5 and in the middle thereof, said mechanism imparting a suitable, quick reciprocating movement to two rods 21A and 21B. This is shown more in detail in Fig. 1A. To the end of the shaft 19 are secured two eccentric disks 19A and 19B bearing with their circumference respectively against the inner ends of the rods 21A and 21B, which are each provided with an arm 21C and 21D, respectively, a spring 20A being arranged between said arms, so as to keep the inner ends of the rods 21A and 21B against the circumference of the disks 19A and 19B. Thus, upon rotation of the shaft 19, the rods 21A and 21B will be forced to reciprocate in longitudinal direction alternately toward and from each other. The outer ends of said rods are hingedly connected to extensions 22A and 22B secured to the lower face of the plates 16A and 16B. Consequently the plates 16A and 16B will perform similar reciprocating motions. Thus the adjacent edges 16D and 16E of said plates (see Fig. 1B) will have a variable distance S from each other. The variable gaps between said edges (Fig. 1B) is covered by a correspondingly shaped covering strip 16C of greater width which is supported at its ends fixed to the middles of the lower edges of the walls 8A and 8B (see Fig. 1) and which is only a very small distance from the plates 16A and 16B. Between the lower edges of the wall parts 9A—12A and 9B—12B of the container and the plates 16A and 16B there is a small space of about 3 cm., whereas the other wall parts of the container adjoin the plates with a minimum of clearance. In front of each of the so formed eight outlet slits for the material in the container a slide is provided by which the slit can be closed or reduced in width. The slides are combined in groups of four to a single unit 23A and 23B, respectively, as shown in Fig. 1C for the unit 23B. The four slides $23^I$, $23^{II}$, $23^{III}$, and $23^{IV}$ of this unit 23B are connected together by means of connecting strips 300, 301 and 302, respectively extending along the wall parts 13B, 14B and 15B of the container (see Fig. 1); in each combination of slides two connecting strips, such as the strips 300 and 302 in Fig. 1C, are provided with lips 24 having vertical slits 24B. By means of a winged nut 25 which can be screwed upon a bolt secured in the adjacent wall of the container, each lip may be locked at the desired elevation. When the widths of the eight slits have been adjusted in this manner at an equal value for all slits, upon reciprocating movement of the plates there will pass through all said slits a flow of material which is equal per unit of length of the slit.

The edge 26A of the plate 16A and the edge 26B of the plate 16B constitute the strewing edges of the plates over which the strewable material will leave the plates and fall upon the ground. The flow of material over said edges should be consequently constant per unit of length, while in order to obtain a good joining of the areas on the ground controlled by the edges 26A and 26B, the left end of the edge 26B has been arranged straight behind the right end of the edge 26A.

For a good operation of the distributing device it is desirable that the material having left the container will move as much as possible along lines parallel to the guide bars 6A and 6B towards the strewing edges 26A and 26B. However, the speed at which the material moves over the plates 26A and 26B is of no importance, when said material has already left the container. In order to favour the rectilinear movement, there are partially provided in the plates, at the places where the material has to travel over a long distance, grooves 27 ceasing in close proximity of the strewing edges so to permit the material to pass over the edge in equally distributed condition. Furthermore the part of the plate 16A which is located on the left hand side of the container and which has a considerable length, since the width of the wall part 9A is large, is downwardly inclined, so that the material will move over said part at a higher speed. The plate 16B is made in a similar manner with a sloping outer portion. At the bends 28A and 28B in the plates 16A and 16B each triangular extremity may be either loosened and removed from the remaining portion of the plate or it may be swung upwards (as will be described more in detail with reference to Figs. 4 and 5), by which the width of the device will be reduced to the normal width of a tractor. To this end it is necessary that the lateral width of the container is not larger than the width of the tractor and that the container, when suitable proportions are desired, extends at most about half the total lateral dimension of the combination of the plates 16A and 16B.

Before use the container is substantially equally filled with material and by the movement of the plates the mass will be automatically spread out. With a predetermined adjustment of the slits under the groups of slides 23A and 23B, the quantity of material that is strewn per unit area is defined by the speed of rotation of the shaft 19 and by the travelling speed. Since these speeds may be chosen generally independent of each other, this is a means to adjust the strewn quantity per unit area. A further adjustment can be obtained by varying the width of the slits.

Figure 5:
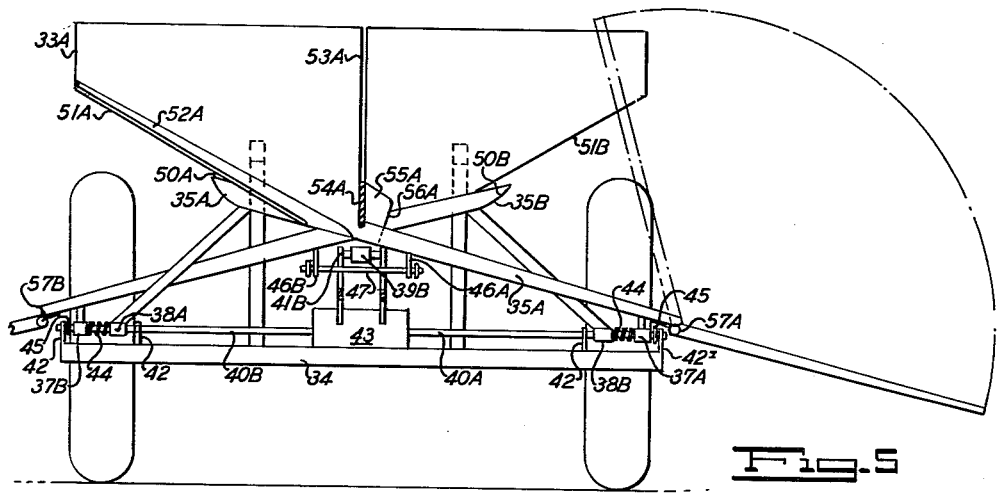
Figure 5A:
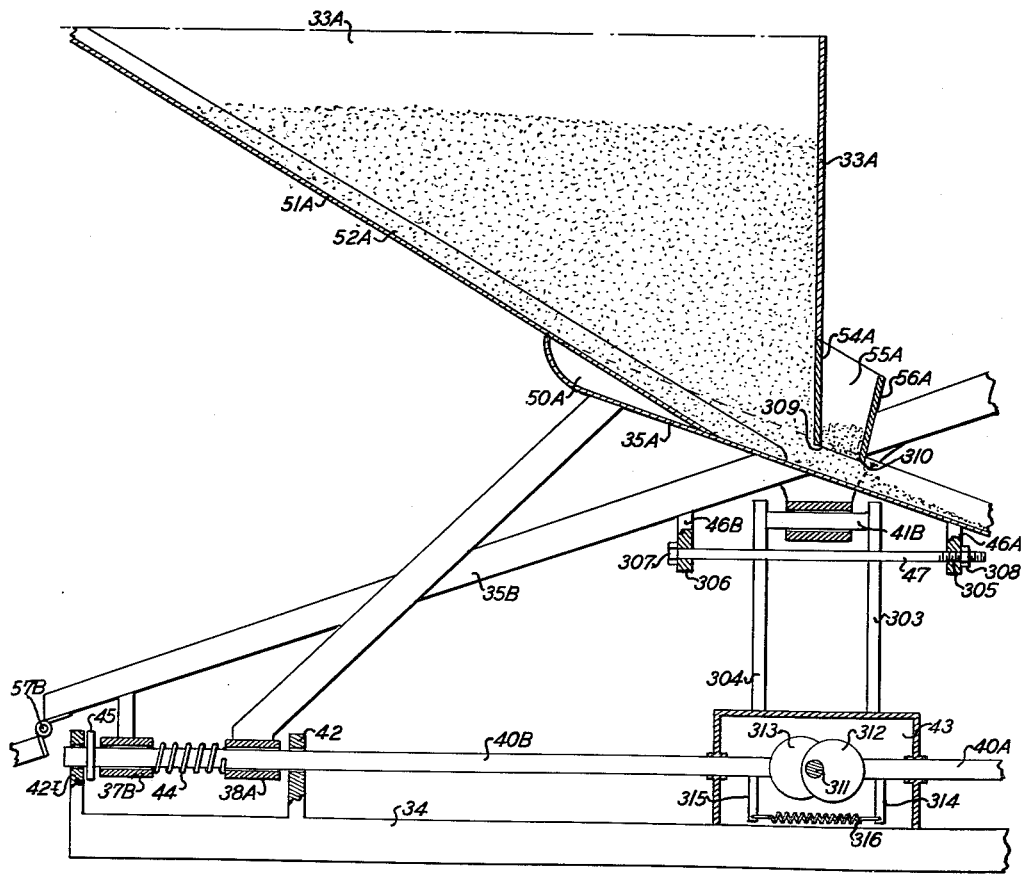
Fig. 5A shows the most important parts of this distributor illustrated in the left hand part of Fig. 5 more in detail.

The device according to Figs. 4, 5 and 5A is mounted upon a tractor 30 of which the rear axle stay 31 is provided with a supporting structure 32 carrying two containers 33A and 33B, as well as a horizontal beam 34 located under said containers and arranged transversely to the direction of movement of the tractor.

When a vertical plane is supposed to be erected through the beam 34, the containers 33A and 33B are respectively located behind and in front of said plane. Moreover the container 33A is located wholly to the left and the container 33B wholly to the right of the plane of symmetry of the tractor 30, said containers being provided in the proximity of said plane of symmetry with openings which are covered on the lower side by inclined plates 35A and 35B, constituting supporting members for the material in a container located near an opening and for the material having left said container, as long as said material, which moves transversely to the direction of travel of the tractor, has reached one of the edges 36A and 36B and falls upon the ground. The movement of the material over the plates is caused at will by a shaking or bumping motion of the plates in a horizontal direction transversely to the direction of travel, as will be described hereinafter more in detail. In order to enable the plates to perform said movements, each plate is provided at three places with a guiding bushing adapted to slide upon a horizontal rod. As shown the plates 35A and 35B are respectively provided with guiding bushings 37A, 38A, 39A and 37B, 38B, 39B. The bushings 37A and 38B are slidable upon a rod 40A, the bushings 37B and 38A are slidable upon a rod 40B, whereas the bushings 39A and 39B are respectively slidable upon a rod 41A and 41B (see also Fig. 5A). All said rods are supported by the beam 34, each of the rods 40A and 40B being borne by two sliding bearings 42 and $42^I$, so that said rods can be moved to and fro by a vibrating mechanism 43 which will be described hereinafter, whereas the rods 41A and 41B are immovably connected to the beam 34 by means of uprights 303 and 304 (see Fig. 5A). Between the bushings sliding on each of the rods 40A and 40B is provided a spring 44, said springs tending to move the plates 35A and 35B as much as possible away from each other. The rods 40A and 40B are further provided with abutments 45 cooperating with the bushings 37A and 37B.

The mechanism 43 serves to move the rods 40A and 40B exactly in opposite reciprocating motion with regard to each other. Said mechanism comprises a shaft 311 (see Fig. 5A) driven by the motor of the tractor 30 and carrying two oppositely arranged eccentric disks 312 and 313 bearing with their circumference against the inner ends of the rods 40A and 40B. Each of said rods carries an arm 314 and 315, respectively, and between said arms a draw spring 316 is arranged. Thus, upon rotation of the shaft 311 the rods 40A and 40B will perform reciprocating movements alternately toward and from each other. If these reciprocating movements are effected, the plates 35A and 35B will perform corresponding reciprocating movements due to the springs 44 and the abutments 45. Against the lower face of each of the plates 35A and 35B is respectively welded an extension 46A, 46B provided with an aperture 305 and 306, respectively. A bolt 47 passes through both of said apertures. The distance between the head 307 and the nut 308 of this bolt is somewhat smaller than the greatest distance which may occur between the remote sides of the extensions 46A and 46B during the reciprocating motion in the absence of a bolt. Upon outward movement of the plates 35A and 35B the extensions 46A and 46B will suddenly strike against the head 307 and the nut 308 of the bolt 47. In this manner a shockwise movement of the plates is caused without transmitting vibrations to the remaining parts of the device. A shockwise motion of the plates is necessary for some sorts of materials to be spread, though not for all of them. If materials are concerned which will already move over the plates at a sufficient speed, when the plates perform a continuous movement, the bolt is removed. For materials which can be displaced very difficultly, a bumping or striking action should occur when the speed of the plates is large; this may be obtained by reducing the distance between head and nut of the bolt 47. In this manner it is also possible to adjust the quantity of material strewn at each stroke. In order to be able to adjust this quantity of strewn material when the bolt 47 has been removed, the amplitude of the movement of the rods 40A and 40B may be made adjustable, e.g. by modifying the eccentricity of the eccentric disks 312 and 313, as hereinafter described in detail.

The plates 35A and 35B are respectively provided with upstanding edges 48A, 49A, 50A and 48B, 49B, 50B at the places where no material should leave the plate.

The container 33A is provided with a bottom 51A inclined in the same direction as the plate 35A but having a greater inclination than said plate, the lower edge of said bottom having only such a small distance to the plate as is necessary for moving the plate with the greatest admissible amplitude to prevent contact with the plate. The plate 35A carries near the opening in the lower portion of the container 33A four flat bars 52A which serve that, when the container is getting empty, no material can adhere on the bottom 51A. By this a constant spreading of material per unit area is assured until the container is wholly empty. Moreover the container has a vertical and rectangular wall surface 53A adjacent to which a slide 54A is provided, of which the lower edge 309 is situated nearer to the plate 35A than that of the wall surface 53A. On the slide 54A two vertical supporting surfaces 55A are fixed carrying a partition 56A with a horizontal lower edge 310.

This lower edge is nearer to the plate 35A than that of the slide 54A, so that the layer of material moving over the plate under the slide 54A is not allowed to pass at the entire thickness; thus the partition 56A operates as a scraping or stripping wall. The thickness of the actually outflowing layer is thus defined by the height of the lower edge 310 of the partition 56A above the plate 35A. This height may be adjusted by adjusting the slide 54A in height.

The container 33B is arranged in the same manner as the container 33A. The slide 54B, corresponding to the slide 54A, is situated with the latter in a vertical plane and is integral therewith, by which the adjustment is greatly simplified and an equal strewing action of both plates 35A and 35B is assured.

The large width of the device, which is very favourable for an economic operation, may be reduced for the purpose of transport over roads and through gates by tipping up the outer extremities of the plates 35A and 35B on hinge axes 57A and 57B. It is also possible to disconnect the hinges, after which the outer extremities can be carried along separately.

Figure 6:
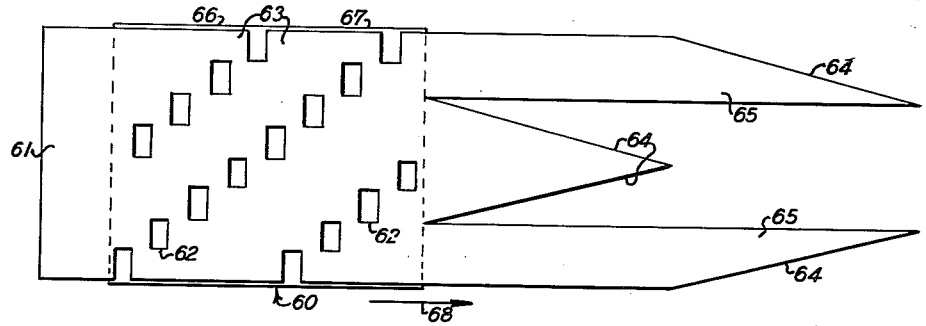
Fig. 6 is a plan view of a detail of a third embodiment.
Figure 6A:
Fig. 6A is an elevational view of Fig. 6.

A modified form of a plate to be put into reciprocating motion for equally strewing material is shown in Figs. 6 and 6A. The plate 60 comprises a rectangular portion 61 located under an opening of a container, a portion 63 provided with openings 62 and a portion 65 provided with strewing edges 64. Under the portion 63 are provided a plate 66 and a plate 67 in which openings are formed according to the same design as the openings 62 in the portion 63. Said plates are used as slides to be displaced in the direction of the arrow 68 or in opposite direction, whereby the openings 62 can be reduced in size. The plate 60 is moved to and fro in its longitudinal direction. The slides 66 and 67 are experimentally put in a position in which the openings 62 allow the passage of such quantities from the layer of material moving thereover in the direction of the arrow 68 that an equal spreading of the material over the total length of the portions 63 and 64 is obtained.

Figure 7:
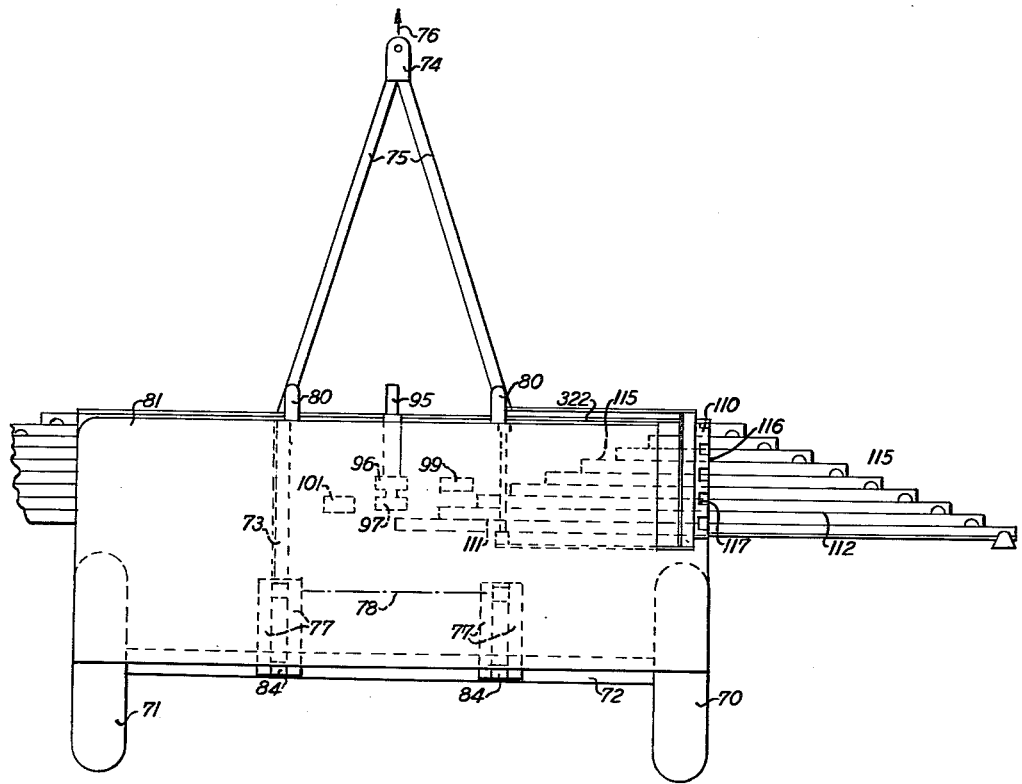
Figs. 7, 8 and 9 show respectively in plan view, in back elevation and in side elevation a fourth embodiment of the device according to the invention.
Figure 8:
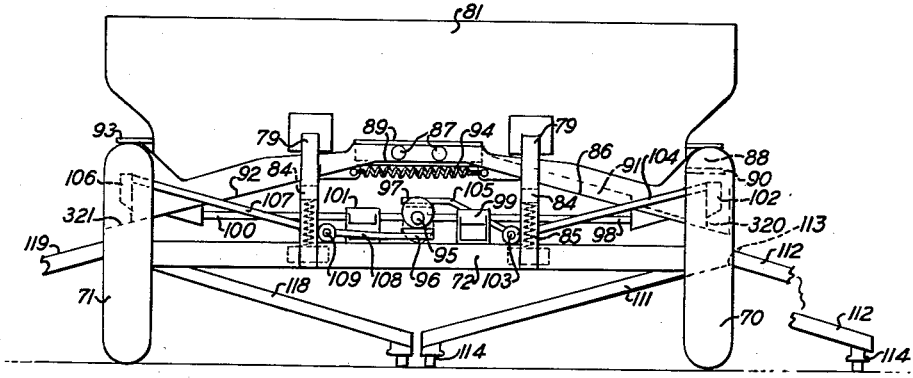
Figure 9:
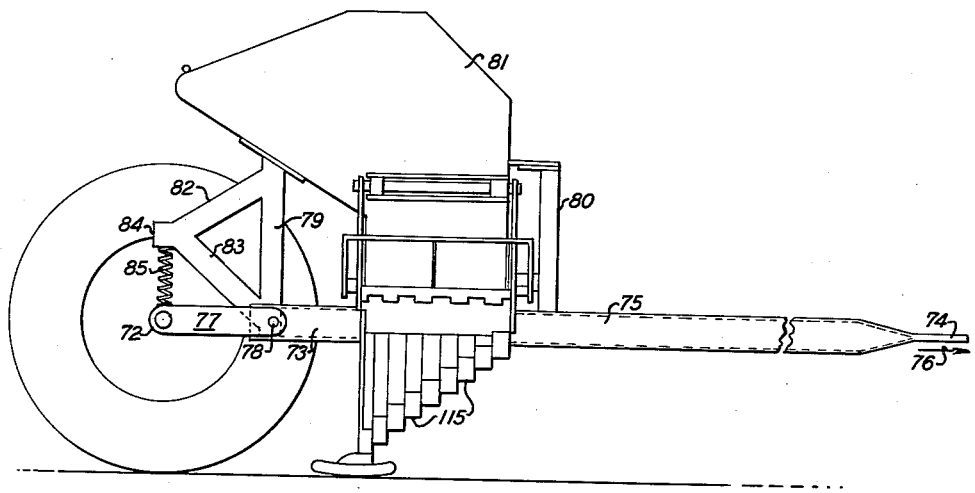

The device illustrated in Figs. 7–9 is supported on running wheels 70 and 71 rotatably mounted on a horizontal tube 72. Said tube forms part of a frame, further comprising two parallel horizontal beams 73 and two horizontal beams 75 intersecting each other in a point 74. In said point 74 fastening means are provided to connect the device to a fixed point of a tractor (not shown), so that the device can be drawn forward with the aid of said tractor in the direction of the arrow 76. The tube 72 carries arms 77 which are hingedly connected to the rear ends of the beams 73. The common hinge axis has been indicated by the reference numeral 78. On the rear ends of the beams 73 are fixed vertical bars 79 carrying in conjunction with supporting bars 80 on the rear ends of the beams 75 a container 81 which can be filled from its upper end with the material to be spread over the ground. By means of bars 82 and 83 the bars 79 are connected to supports 84 for two vertical compression springs 85 which are located between said supports 84 and the tube 72. The length and rigidity of said springs are such that the arms 77 remain approximately in horizontal position. The oblong container 81 has an outlet opening 320 and 321, respectively, at each end. These openings are located approximately straight before the wheels 70 and 71, the under side of the container 81 being downwardly inclined from the centre towards said openings. Under the inclined under side on the right hand side and the corresponding outlet opening 320 is provided a supporting surface 86 which can be moved to and fro in a horizontal direction at right angles to the direction 76 and which is guided during said movement by rollers 87 and 88 running in horizontal guides 89 and 90 fixed to the container 81. An upstanding edge 91 on the rear side of the supporting surface 86 and an edge 322 of the same height on the front side thereof prevent strewable material from escaping along these sides.

Under the left half of the container 81 is provided a supporting surface 92 which is the mirror image of the supporting surface 86 and which is guided in the same manner by rollers in the guides 89 and in guides 93. The adjacent ends of the supporting surfaces 86 and 92 are connected together by a draw spring 94, so that said surfaces always tend to move towards each other. In order to put the supporting surfaces 86 and 92 and some other movable parts of the device into reciprocating movement, a shaft 95 is provided which extends in the direction of travel and which is driven by the power take-off of the tractor, when the machine is drawn forward by said tractor over the field. The shaft 95 carries two eccentric disks 96 and 97 which are staggered with regard to each other by 180°. Disks 360 and 361 are mounted eccentrically on the disks 96 and 97, respectively, in a manner to permit angular displacement of the disks 360 and 361 with respect to the related disks 96 and 97. For example, as shown in Figs. 8C, the disks 96 and 97 can have elongated arcuate slots 364 therein to receive bolts 363 which adjustably secure the disks 360 and 361 thereto. To the supporting surface 86 is connected one end of a horizontal rod 98 which is slidable to and fro in transverse direction in a guide 99 rigidly connected to a beam 323 of the frame and which bears against the disk 360 at least during part of each revolution of the shaft 95. In a similar manner a rod 100 with a guide 101 is connected to the supporting surface 92, said rod cooperating with the disk 361. Upon each revolution of the shaft 95 the supporting surfaces 86 and 92 are thus once separated from each other, after which the spring 94 forces both surfaces together again.

Figure 8A:
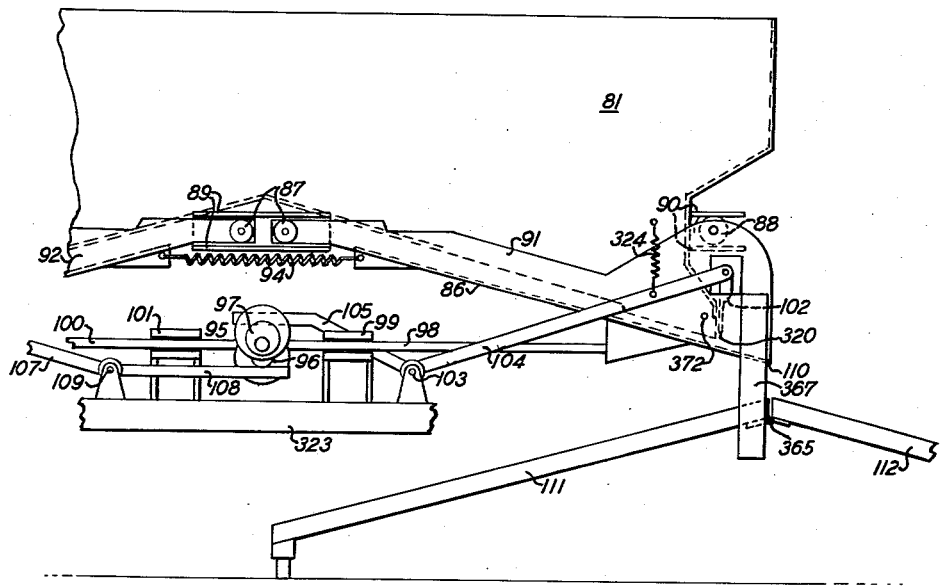
Fig. 8A is a portion of the structure of Fig. 8 on enlarged scale.

It will be evident that e.g. the supporting surface 86 tends to convey material from the container along its upper face downwardly to the right. The quantity which can be displaced thereover per unit of time is controlled by a slide 102 which may be moved up and down by means of a lever system 104 rotatable on an axis 103. For this purpose to the lever system 104 is connected an arm 105, the free extremity of which is controlled by the upper side of the eccentric disk 360 (see Fig. 8a). A spring 324 tends to keep the slide 102 in its open position. The slide is opened to a certain extent when the surface 86 moves to the right and is kept closed by the disk 360 during the returning movement of the surface 86. The amplitude of the reciprocating motion of the supporting surface 86 and the slide 102 may be adjusted as required, e.g. by varying the eccentricity of the disk 360. The desired variation in the eccentricity of disk 96 can be achieved by loosening the bolts 363 holding the disk 360 thereto, whereupon, the disk 360 can be turned relative to the disk 96 by reason of slidable engagement of the loosened bolts 363 in the related slots 364.

A slide 106 is likewise cooperating with the supporting surface 92. The operation of this slide is effected by a lever system 107 and by an arm 108 cooperating with the lower side of the eccentric disk 361 and rotatable on an axis 109, in such a manner that the supporting surfaces 86 and 92 will discharge equal quantities of material from the container 81.

The upper edges of the slides 102 and 106 are located at an appreciably higher elevation than the adjacent edges of the outlet openings 320 and 321 of the container 81, so that there is no risk that any material would pass over the slides. The material moves under each slide in a layer of uniform thickness and then reaches the lower edge 110 of the supporting surface in question. These lower edges are provided with rectangular incisions 117, as has been shown for the surface 86 in the right hand part of Fig. 7.

Under the edge 110 two oppositely inclined supporting surfaces 111 and 112 meet each other in a horizontal edge 113 situated in the direction of travel. Near this edge said supporting surfaces are hinged on an axis (not shown) parallel to said edge. The lower ends of the supporting surfaces are each supported by a sliding piece 114, by which it is possible to arrange said supporting surfaces as low as possible, so that the whole construction can be kept very low. The sliding pieces 114 also serve as marking means for making a visible track on the ground, so that, during each successive pass over the field, the visible track previously made on the ground can serve as a guide for the driver to avoid repeated strewing of material on the same area or the failure to strew any material on an area. The supporting surfaces 111 and 112 are provided with gutters, the lower extremities 115 of which are equally distributed over the width of the striplike area of the ground that has to be strewn by means of said surfaces, so that if an equal quantity of material is supplied to each gutter per unit of time, an equal distribution of the material over said area is assured. The equal supply of material to all gutters is obtained by the special form of the edge 110. From a portion 116 (Fig. 8E) of the edge 110 the material falls uniformly into two adjacent gutters of the surface 112, whereas from an incision 117 of said edge 110 the material is equally delivered to two adjacent gutters of the surface 111. The edge portions 116 and the incisions 117 are further of equal width and will consequently deliver the same quantity of material. It will be understood that the edge portions 116 and the incisions 117, which in the illustrated embodiment are respectively located above the surface 112 and above the surface 111, may be also located in alignment, but in this case separate guiding means would be necessary to deliver the material passing over the edge portions 116 and 117 uniformly into two adjacent gutters respectively of the surface 112 and 111. Such guiding means may be also provided as additional means in the embodiment shown. The surfaces 111 and 112 are secured to the surface 86 so that the surfaces 111 and 112 take part in the reciprocating movement of the surface 86, by which a uniform movement of the material over said surfaces will be assured.

In the same manner as the surface 86 feeds the movable parts or surfaces 111 and 112, the surface 92 feeds two corresponding surfaces 118 and 119 taking part in the horizontal movement of the surface 92. The surfaces 112 and 119 may be easily swung upwards, by turning said surfaces around an axis, as at 365 in order to reduce the width of the device, when the same is out of operation and has to be transported or stored.

In certain cases it may be desirable to make a supporting surface discharging material from the container underneath an edge more or less stepwise instead of plane, so that steeper portions corresponding to the rises of a stair are alternated by portions of smaller steepness corresponding to the treads of a stair. The edge under which the material passes should of course have the same direction as the longitudinal direction of the said portions. The steeper portions will assure delivery of the desired quantity, even if the material to be strewn is of greater consistence.

Figure 10:
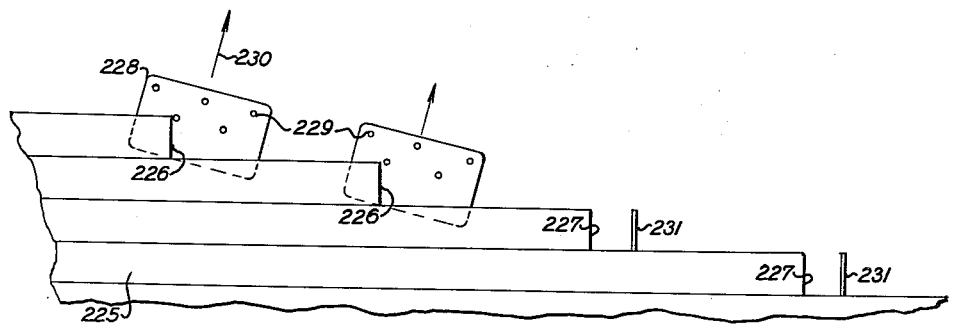
Fig. 10 is a plan view of a part of an inclined supporting surface of the device according to the invention.

A number of downwardly inclined gutters, of which the outer ends are distributed over a considerable width, as is the case in the devices according to the invention, will tend, instead of spreading the material uniformly, to drop the material upon a number of lines. Even on these lines the material needs not fall regularly, since at every shaking or bumping motion a small quantity will simultaneously leave the edge, so that said lines on the ground will be only covered with material at regular intervals. In order to obtain a more equal spreading, according to Fig. 10 the lower ends 226 of a number of inclined gutters 225 may be provided with small surfaces 228, either adjoining said lower ends or being situated somewhat under said ends. These surfaces 228 are provided on their upper side with unevennesses, such as small pins 229, and are sloping down in the direction of the arrows 230. Upon said braking surfaces 228 some material is accumulated, which material will fall on the ground more continuously and in a better spread condition.

Another possibility which may occur at the ends of the gutters in the device according to the invention, at least when the small braking surfaces 228 are not available, is the influence of the speed of the material in a direction transverse to the direction of travel, by which the material, dependent on the height of the end of the gutter above the ground, will fall more or less laterally away from this end. This drawback may be eliminated by disposing vertical surfaces 231 adjacent to the ends 227 of the gutters 225. The material leaving the edges 227 will abut against these surfaces 231 and lose its speed in lateral direction.

What we claim is:

1. A vehicular device for spreading strewable material over a strip-like area of the ground during ground traversing movement of the device; comprising the combination of a vehicle having at least two wheels located on each of the opposite sides of the longitudinal axis of the vehicle; a supporting frame carried by said vehicle; at least one container for the material to be strewn mounted on said frame and having at least one outlet opening; at least one supporting member operatively associated with said frame for receiving the material to be strewn, said member extending from beneath said outlet opening in lateral direction from said longitudinal axis of the vehicle to a point located a substantial lateral distance beyond a wheel of the vehicle, said supporting member having at least one discharge edge arranged at an acute angle to said longitudinal axis, and means coupled to said supporting member whereby the latter is reciprocated to cause the material supplied thereto through said outlet opening of the container to move substantially laterally over said supporting member and to be uniformly distributed over said edge onto the ground, said supporting member having a displaceable extremity to permit reduction of the width of the device.

2. A device as defined in claim 1, wherein said supporting member comprises a plate which is provided with openings allowing the strewable material to fall upon the ground.

3. A device as defined in claim 1, wherein the container for the strewable material includes and is closed at its lower end partially by a bottom fixedly secured to said container and partially by said supporting member, said container having a lower edge spaced from the supporting member and allowing the strewable material to leave the container in a layer moving over said supporting member.

4. A device as defined in claim 3 comprising agitating means connected to the supporting member and adapted to prevent adhering of the material in said container.

5. A device as defined in claim 1, wherein the supporting member is at least partially downwardly inclined to cause the material to flow in downward direction.

6. A device as defined in claim 1, wherein the supporting member is provided with grooves for guiding the material.

7. A device as defined in claim 1, comprising two substantially similar trapezoid-shaped supporting members, including the first said supporting member, adjoining each other and having corresponding obliquely disposed sides and forming together a parallelogram having lateral sides which constitute strewing edges.

8. A device as defined in claim 7, wherein said container is located over both the supporting members, said container having two side walls having a stepwise configuration with portions aligned over the supporting members in the direction of movement of the material and portions aligned transversely thereto.

9. A device as defined in claim 1, comprising two substantially triangular supporting members including the first said supporting member, a separate container including the first said container for each supporting member, the movement of the material on the one supporting member being opposite to that on the other and the containers having openings lying substantially behind each other in the direction of travel of the device.

10. A device as defined in claim 9, wherein both supporting members slope downwardly in opposite directions.

11. A device as defined in claim 1, wherein two supporting members including the first said member and comprising a shaking device coupled to and moving said members alternately towards and away from each other.

12. A device as defined in claim 11, comprising abutments which are free from the frame and which limit the movement of each supporting member in the direction of the horizontal component of the movement of the material with regard to that of the other supporting member.

13. A device as defined in claim 12, comprising means to put said abutments out of operation.

14. A device as defined in claim 12, comprising means to adjust the distance between two predetermined points on the supporting members at which shock occurs due to said abutments and thereby to adjust the intensity of the shock.

15. A device as defined in claim 1, comprising means to adjust the amplitude of the oscillating movement.

16. A device as defined in claim 1, comprising an upstanding stripping wall and wherein outside the container adjacent to the wall, under the lower edge of which the material leaves the container, said upstanding stripping wall is provided extending to a higher elevation than said lower edge, the lower edge of said stripping wall being located closer by the supporting member than the lower edge of the wall of the container.

17. A device as defined in claim 9, comprising an adjustable slide common to both containers and wherein the lower edges of both containers, under which the material leaves said container, are formed by the lower edge of said adjustable slide.

18. A device as defined in claim 16, comprising for each container, a stripping wall connected to the common slide.

19. A device as defined in claim 1, comprising a restricting member operatively associated with said supporting member and wherein said supporting member cooperates with said restricting member for limiting the thickness of the layer of the material moving over said supporting member, the supporting member, at least in a portion thereof which is located at a higher elevation than the lower edge of the restricting member, including narrow strips which are substantially perpendicular to said lower edge and which are of steeper inclination than the remaining part of the supporting member.

20. A device as defined in claim 1, wherein a portion of said supporting member serves as a part of a container bottom and is provided with upstanding edges of which each part extends above the immediately adjacent lower edge of the container in question.

21. A device as defined in claim 1, wherein said container has a plurality of outlet openings and the total length of the outlet openings, through which material is discharged from a container under an edge over a supporting member, is small in relation to the width of the area controlled by the device.

22. A device as defined in claim 1, comprising marking means on the lower end of the supporting member to leave a visible track on the ground.

23. A device as defined in claim 1, comprising a second supporting member sloping laterally beyond the wheels and a third supporting member sloping down towards a point located between said wheels, said second and third supporting members being downwardly inclined from about the same position and being at this position of about the same width in the direction of travel of the device, the first said supporting member having an edge located over said position, the first said member supplying material to the second and third members over said edge, whereby material moving along the first said member falls upon the second and third member.

24. A device as defined in claim 1, comprising gutters on the supporting member, the gutters having free extremities arranged that the widths of the portions of the area on the ground controlled by the individual gutters are substantially proportional to the quantities of material supplied to the gutters per unit of time.

25. A device as defined in claim 24, wherein the gutters are combined in groups as rigid structures.

26. A device as defined in claim 1, wherein near an edge of a supporting member over which strewable material leaves said member a braking member is provided, upon which some material is allowed to accumulate, said braking member causing the material to be dropped on the ground substantially in a continuous flow.

27. A device as defined in claim 1, wherein near an edge of a supporting member over which strewable material leaves said member with a speed transverse to the direction of travel an abutting member is provided against which the material abuts to fall thereafter upon the ground with a decreased transversal component of the speed.

References Cited in the file of this patent

UNITED STATES PATENTS

| | | |
|---|---|---|
| 11,609 | Hockman | Aug. 29, 1854 |
| 190,293 | D'Heureuse | May 1, 1877 |
| 705,858 | McWhorter | July 29, 1902 |
| 880,561 | Mitchell | Mar. 3, 1908 |
| 908,207 | Crane | Dec. 29, 1908 |
| 1,601,039 | Pereda | Sept. 28, 1926 |
| 1,668,516 | Litchfield et al. | May 1, 1928 |
| 2,232,481 | Schroder | Feb. 18, 1941 |
| 2,280,234 | Harvey | Apr. 21, 1942 |
| 2,416,898 | Breeze | Mar. 4, 1947 |
| 2,583,608 | Smith | Jan. 29, 1952 |
| 2,623,751 | Kaller | Dec. 30, 1952 |
| 2,647,756 | Allersma | Aug. 4, 1953 |
| 2,678,216 | Gandrud | May 11, 1954 |

FOREIGN PATENTS

| | | |
|---|---|---|
| 107,988 | Australia | July 13, 1939 |
| 225,864 | Germany | Sept. 23, 1910 |
| 415,737 | Germany | July 3, 1925 |
| 22,018 | Great Britain | of 1907 |
| 669,911 | Great Britain | Apr. 9, 1952 |